May 16, 1961   J. A. O'BRIEN   2,984,789
PULSE MONITORING CIRCUIT
Filed Aug. 13, 1958

TIME →

INVENTOR
J. A. O'BRIEN
BY
R. C. Winter
ATTORNEY

United States Patent Office 2,984,789
Patented May 16, 1961

2,984,789

PULSE MONITORING CIRCUIT

Joseph A. O'Brien, New Providence, N.J., assignor to Bell Telephone Laboratories, Incorporated, New York, N.Y., a corporation of New York Filed Aug. 13, 1958, Ser. No. 754,872

8 Claims. (Cl. 328—120)

This invention relates to electrical checking circuits and, more particularly, to circuits for automatically monitoring the output of a pulse generator.

Various systems are known in the art which rely upon regularly spaced signal pulses to control or perform certain functions. Such information handling or data processing systems are generally referred to as being synchronously operated and usually have a control unit, one function of which is the generation of a series of regularly spaced pulses to time or clock the operations of other parts of the system. As these systems are synchronously operated it is obviously imperative that the timing or clock pulses of this common control unit be present at all times and be present without any deviation in the time of occurrence in the operating cycle of the train of such pulses.

Accordingly, a reliable pulse monitoring circuit should be provided which is capable of detecting the delay, displacement, or disappearance of a pulse from the generated train of timing or clock pulses. Further, such pulse monitoring circuit should then be able to initiate a signal indicative of this condition.

There are known circuits which are capable of performing such a pulse monitoring function; for example, it is known to maintain an amplifying device cut off by a bias derived from the monitoring pulses. Such an arrangement, however, draws appreciable power from the pulses themselves and in many applications is unsuitable for this reason. Such a circuit is also inapplicable to the monitoring of a pulse train where the time interval between pulses becomes appreciable. Accordingly, what is desired for pulse monitoring circuits for electronic information handling systems is a circuit which draws a minimum amount of power from the pulse train being monitored and which is capable of functioning with pulses spaced relatively far apart in time.

It is, therefore, a general object of this invention to provide an improved pulse monitoring circuit.

A further object of this invention is to decrease the loading imposed upon a pulse generator by a pulse monitoring circuit.

Another object of this invention is to provide a circuit for monitoring pulses which occur at relatively widely spaced time intervals.

An additional object of this invention is to increase the reliability of circuitry for monitoring a series of pulses in a pulse train.

In accordance with this invention the output of the pulse source to be monitored is directed to a plurality of monostable trigger devices, each exhibiting a normal, or quiescent, state and an active, temporarily stable condition. As known in the art, the monostable trigger device, once triggered by a pulse, remains in its active state for a period which is independent of the shape of the triggering pulse. The ON time, or interval during which each monostable device remains in its active condition, is predetermined in accordance with this invention to exceed the cyclic period of the triggering pulses from the pulse source.

An "AND," or coincident logic, gate is interposed between each monostable trigger device and the pulse source. Each "AND" gate, as well known in the art, has a plurality of inputs and a single output. The "AND" gate presents a signal at its output if, and only if, signals are applied concurrently to all of its input leads.

The stages of the monitoring circuit, each comprising a monostable device and an "AND" gate, are arranged in a ring configuration so that the output of each stage in conjunction with a signal from the pulse source controls the input to the next succeeding stage. The outputs of the stages of the monitoring circuit are also applied through an "OR" gate and inverter to a pulse generator and to an input of one stage. The "OR" gate, also known in the art, produces an output signal if a signal is present at any one of its input leads. The inverter reverses the polarity of the signal at its input and may, for example, be a vacuum tube or common emitter transistor amplifier stage.

As successive pulses are presented from the pulse source, first one stage and then another of the detection circuit is triggered to its active state. Because of the gating action of the input circuitry, each succeeding pulse from the pulse source is directed to the next monostable device in sequence to trigger it in turn to its active condition. Each triggered device remains in its active condition for a predetermined time and then reverts to its quiescent state. This time has been selected, with respect to the cyclic period of the input pulses, so there is a slight overlap of the active output signals from successive stages. Thus so long as the pulses from the pulse source continue without a delay or interruption, at least one stage is energized with the result that no signal appears at the output of the inverter. However, if the appearance of any input pulse is delayed for more than a predetermined interval, the last stage of the detection circuit to be triggered will resume its quiescent state and a signal will be derived from the inverter to trigger the pulse generator at the output and provide an indication of the malfunction of the pulse source. This same signal then is available at an input of one stage to permit resumption of the operation upon appearance of the next input pulse.

It is a feature of this invention that a series of monostable trigger devices, arranged to respond successively to pulses in a cyclical pulse train, are energized for predetermined periods in excess of the cyclic period of the pulse train.

It is an additional feature of this invention that a plurality of monostable trigger devices arranged in combination with logic circuitry in a ring configuration to be responsive in sequence to a train of pulses, be connected to a common output to provide a signal in the event that all the trigger devices are simultaneously in a quiescent state.

It is a further feature of this invention that the common output be connected to an input of the ring such that the conjunction of the signal at the common output with the next input pulse will permit resumption of the operation.

A complete understanding of this invention and of these and various other features thereof may be gained from consideration of the following detailed description and the accompanying drawing, in which.

Figure 1:
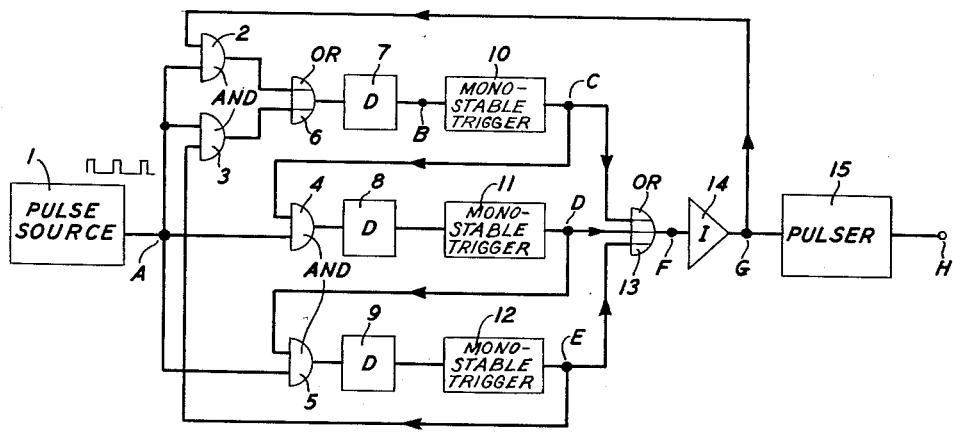
Fig. 1 depicts a block diagram of one specific embodiment of the invention.

Fig. 1 depicts in block diagram form a pulse source 1, the output of which is applied in parallel to "AND" gates 2, 3, 4 and 5. The outputs of "AND" gates 2 and 3 are applied through an "OR" gate 6 and a time delay circuit 7 to a monostable trigger device 10. The output of "AND" gate 4 is applied through the delay circuit 8 to a monostable trigger device 11 while similarly the output of "AND" gate 5 is applied through a delay circuit 9 to a monostable trigger device 12. The output of each of the trigger devices is applied as an input to the "AND" gate of the next succeeding stage and thereby controls the input path of that stage in conjunction with pulses from source 1. For example, the output of trigger device 10 is applied to the input of "AND" gate 4. The output of all of the trigger devices 10, 11 and 12 are also applied to the "OR" gate 13 and thence through an inverting circuit 14 to a pulser 15. There is a connection from the output of the inverter circuit 14 to the input of the "AND" gate 2.

Operation of the monitoring circuit of this invention depicted in Fig. 1 is initiated by means of coincident signals from the pulse source 1 and the inverter 14 at "AND" gate 2. Since it is assumed that no previous pulses have been applied from pulse source 1, none of the trigger devices 10, 11 and 12 is in the active condition. Accordingly, the output signal of the inverter 14 is applied to one input of "AND" gate 2. The first pulse from pulse source 1 provides a second input to "AND" gate 2, the output of which passes through "OR" gate 6 and the delay circuit 7 to energize the trigger device 10. Once the operation of the monitoring circuit of Fig. 1 has been initiated, the "AND" gate 2 is inactive until the entire circuit has become deenergized once again.

The output of energized trigger device 10 performs two functions. It furnishes one input to "AND" gate 4 and applies a signal through "OR" gate 13 to the inverter 14, thereby terminating the active signal at the output of inverter 14. As previously mentioned, each trigger device is designed to remain in its active state for a brief time in excess of the cyclic period of the input pulses. Therefore, in normal operation the next succeeding input pulse appears while the output of trigger 10 is applied to "AND" gate 4. The resulting output signal from "AND" gate 4 thereupon passes through delay circuit 8 to energize the trigger device 11. The output of trigger device 11 provides a signal for one input of "AND" gate 5 and maintains the output of inverter 14 in its inactive condition.

Successive pulses from the pulse source 1 are applied in a similar fashion to successive stages of the monitoring circuit with the result that at least one monostable device is always energized, and the output of the inverter 14 is maintained inactive. Since the output of trigger device 12 is applied as an input to "AND" gate 3 connected to trigger device 10, successive pulses from pulse source 1 energize the trigger devices in succession around the ring.

If, however, the pulse source 1 fails to generate a pulse in proper sequence, the currently triggered stage of the monitoring circuit returns to its quiescent state before the next stage is energized. The resultant lack of an active stage permits the inverter 14 to produce a signal at its output. This signal energizes the pulser 15 which generates a pulse to indicate that there has been a malfunction of the circuitry incorporating the pulse source.

Delay circuits 7, 8 and 9 are interposed in respective stages of the detection circuit to provide a time delay equal to the width of an input pulse. Such a delay is necessary to prevent a triggered stage from applying a signal to the succeeding "AND" gate while the input pulse which initiated its activation is being applied to the "AND" gates. Failure to provide the delay would otherwise produce the triggering of two or more stages during the period of one input pulse.

Figure 2:
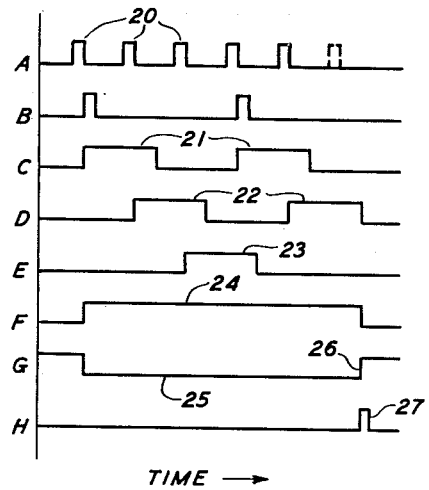
Fig. 2 is a diagram showing the time relationships of various signals occurring at different points in the circuit of Fig. 1.

The sequence of events in the detection circuit of Fig. 1 may be better understood from an examination of the waveforms plotted with respect to time in the diagram of Fig. 2. These waveforms are derived from various points within the circuit of Fig. 1 which bear corresponding designations. Waveform A represents a train of pulses 20 from pulse source 1. The pulse train, for the purpose of illustration, has a pulse missing after the fifth pulse indicated by the dotted outline in Fig. 2. This omission of a pulse corresponds to a malfunction in the pulse source circuitry.

Waveform B represents the input of trigger 10 and illustrates the displacement in time from the pulses of waveform A due to delay circuit 7. The waveforms C, D and E represent the outputs of trigger devices 10, 11 and 12, respectively. It will be noted that the corresponding portions of the output waveforms of adjacent stages overlap each other slightly in time. For example, pulse 21 overlaps pulse 22, pulse 22 overlaps pulse 23, and pulse 23 overlaps the second pulse 21. The result is that the waveform F at the otuput of the "OR" gate 13 is a continuous positive signal 24 so long as one of the monostable circuits is energized. Correspondingly, the output of the inverter circuit 14 in this embodiment of the invention is a negative, or inactive, signal 25 for this same period. Upon the omission of the sixth pulse 20 from the pulse train A, the last triggered device 11 indicated by the last pulse 22 in Fig. 2, returns to its quiescent state, restoring "OR" gate 13 to the inactive condition. The resulting positive signal 26 at the output of inverter 14 triggers the pulser 15, producing for the first time an output therefrom, as indicated by the pulse 27 of waveform H.

Although the pulse detection circuit of Fig. 1 is shown comprising three separate stages, it is clear that additional stages may be added as is necessary, depending upon the conditions to be met. The depicted embodiment of the invention is shown operating with positive polarity signals. It is clear that the invention is not limited to such signals but may be designed to operate with other signals.

It is to be understood that the above-described arrangements are illustrative of the principles of the invention. Numerous other arrangements may be devised by those skilled in the art without departing from the spirit and scope of the invention.

What is claimed is:

1. An electrical circuit for detecting the departure from periodicity of a train of pulses to be monitored comprising a plurality of gating means, means for applying a pulse train to each of said gating means, a plurality of monostable devices each having a quiescent state and an active state, intermediate means connecting each of said monostable devices between successive ones of said gating means to form a ring configuration, output means, means connected between each of said monostable devices and said output means for applying the complement of a distinct output signal from any of said devices to said output means, and means for applying said distinct output signal complement to a single one of said gating means.

2. An electrical circuit as set forth in claim 1 wherein said intermediate means comprises a delay circuit to delay the triggering of any said monostable device for the duration of a pulse from said pulse source.

3. An electrical circuit as set forth in claim 1 wherein said means connected between each of said monostable devices and said output means comprises a signal inverter.

4. An electrical circuit for detecting the malfunction of a pulse generator comprising a plurality of monostable devices, each said monostable device having a quiescent state and an active state, input means connected between each pair of adjacent monostable devices to form a ring configuration, means connecting the pulse generator to each of said input means, means comprising inverting means connecting each of said monostable devices to a pulser for producing a signal from said pulser upon detecting the presence of a quiescent state in all of said monostable devices, and means connecting said inverting means to one of said input means to trigger one of said monostable devices in conjunction with a signal from said pulse generator.

5. An electrical circuit as set forth in claim 4 wherein said input means comprises a delay circuit to prevent the simultaneous triggering of more than one monostable device.

6. An electrical circuit as set forth in claim 5 wherein said input means further comprises a coincidence circuit.

7. An electrical circuit comprising a plurality of monostable devices each having an active state and a quiescent state, a source of pulses to be monitored, the duration of said active state being greater than a cyclic period of said pulses, gating means, means connecting said gating means to said monostable devices for directing the pulses from said source to corresponding ones of said devices thereby causing said monostable devices to change from said quiescent state to said active state, means for detecting the state of any of said monostable devices comprising an inverter, an OR gate for applying the output signals from each of said monostable devices to said inverter, signaling means, and means connecting the output of said inverter to one of said gating means and to said signaling means for producing a signal when all of said monostable devices are in said quiescent state.

8. A pulse monitoring circuit having a plurality of stages connected in a ring, each stage comprising a first AND gate and monostable trigger means, a second AND gate, a pulse source connected to one input of each of said first and second AND gates, feedback means comprising an OR gate and an inverter connected to the output of each monostable trigger means for applying a signal to another input of said second AND gate in the absence of an output signal from said monostable trigger means, means for applying the output of said second AND gate to the monostable trigger means in one of said stages, means for applying the output signal from each of said trigger means to another input of said first AND gate in the succeeding stage, and means for applying the output of said first AND gates to said trigger means in the corresponding stage to place the trigger means in an active state.

References Cited in the file of this patent

UNITED STATES PATENTS

| | | |
|---|---|---|
| 2,486,491 | Meacham | Nov. 1, 1949 |
| 2,774,868 | Havens | Dec. 18, 1956 |
| 2,853,238 | Johnson | Sept. 23, 1958 |